(12) United States Patent
Sakuma et al.

(10) Patent No.: US 10,069,302 B2
(45) Date of Patent: Sep. 4, 2018

(54) POWER FLOW CONTROL SYSTEM AND POWER FLOW CONTROL METHOD

(71) Applicant: NEC Corporation, Tokyo (JP)

(72) Inventors: Hisato Sakuma, Tokyo (JP); Koji Kudo, Tokyo (JP); Hitoshi Yano, Tokyo (JP); Kazuhiko Aoki, Tokyo (JP); Yoshiho Yanagita, Tokyo (JP); Eisuke Saneyoshi, Tokyo (JP); Yuma Iwasaki, Tokyo (JP); Ryo Hashimoto, Tokyo (JP); Takahiro Toizumi, Tokyo (JP)

(73) Assignee: NEC Corporation, Tokyo (JP)

( * ) Notice: Subject to any disclaimer, the term of this patent is extended or adjusted under 35 U.S.C. 154(b) by 295 days.

(21) Appl. No.: 14/768,235

(22) PCT Filed: Dec. 4, 2013

(86) PCT No.: PCT/JP2013/082593
§ 371 (c)(1),
(2) Date: Aug. 17, 2015

(87) PCT Pub. No.: WO2014/129045
PCT Pub. Date: Aug. 28, 2014

(65) Prior Publication Data
US 2016/0006248 A1 Jan. 7, 2016

(30) Foreign Application Priority Data

Feb. 19, 2013 (JP) .................................. 2013-029870

(51) Int. Cl.
*H02J 3/38* (2006.01)
*F03D 9/00* (2016.01)
(Continued)

(52) U.S. Cl.
CPC .............. *H02J 3/381* (2013.01); *F03D 9/257* (2017.02); *H02J 3/28* (2013.01); *H02J 3/383* (2013.01);
(Continued)

(58) Field of Classification Search
CPC ......... F03D 9/257; H02J 13/0006; H02J 3/28; H02J 3/381; H02J 3/383; H02J 3/46;
(Continued)

(56) References Cited

U.S. PATENT DOCUMENTS

2010/0204844 A1* 8/2010 Rettger .................... H02J 3/06
 700/291
2011/0282601 A1* 11/2011 Hoff ........................ G01W 1/12
 702/60
(Continued)

FOREIGN PATENT DOCUMENTS

DE 20 2011 101 677 U1 9/2011
JP 2008-263706 10/2008
(Continued)

OTHER PUBLICATIONS

Extended European Search Report dated Sep. 30, 2016, by the European Patent Office in counterpart European Patent Application No. 13875784.4.
(Continued)

*Primary Examiner* — Kenneth M Lo
*Assistant Examiner* — Chad Erdman
(74) *Attorney, Agent, or Firm* — Finnegan, Henderson, Farabow, Garrett & Dunner, L.L.P.

(57) ABSTRACT

A power flow control system is provided that is capable of improving the reliability of controlling power flow fluctuation and creating wide applicability for systems that control power flow fluctuation. A power-varying device (101) varies the distribution line power amount, which is a value of the
(Continued)

power flow that flows in a distribution line (112) to which is connected a plurality of power sources (111) that each generate power. A measurement device (102) measures an index value relating to the total generated power amount, which is the sum total of the amount of power generated by each of the power sources. A calculation device (103) estimates the total generated power amount from the index value, and according to the estimation result, regulates the amount of change in the distribution line power amount that is changed by the power-varying device.

19 Claims, 8 Drawing Sheets

(51) Int. Cl.
  H02J 3/28    (2006.01)
  H02J 7/35    (2006.01)
  H02J 3/46    (2006.01)
  H02J 13/00   (2006.01)
  F03D 9/25    (2016.01)

(52) U.S. Cl.
  CPC ............ *H02J 3/46* (2013.01); *H02J 13/0006* (2013.01); *H02J 7/35* (2013.01); *Y02E 10/563* (2013.01); *Y02E 10/566* (2013.01); *Y02E 40/72* (2013.01); *Y02E 60/722* (2013.01); *Y02E 70/30* (2013.01); *Y04S 10/123* (2013.01); *Y04S 10/14* (2013.01)

(58) Field of Classification Search
  CPC ........ H02J 7/35; Y02E 10/563; Y02E 10/566; Y02E 40/72; Y02E 60/722; Y02E 70/30; Y04S 10/123; Y04S 10/14
  See application file for complete search history.

(56) References Cited

U.S. PATENT DOCUMENTS

| | | | |
|---|---|---|---|
| 2012/0130556 A1* | 5/2012 | Marhoefer | H02J 3/32 700/291 |
| 2012/0228941 A1 | 9/2012 | Sakai | |
| 2012/0245753 A1* | 9/2012 | Forbes, Jr. | G06Q 10/00 700/295 |
| 2012/0310426 A1* | 12/2012 | Tarnowski | F03D 7/0272 700/287 |
| 2013/0066569 A1* | 3/2013 | Sato | G01W 1/10 702/60 |
| 2013/0184894 A1 | 7/2013 | Sakuma et al. | |
| 2014/0018969 A1* | 1/2014 | Forbes, Jr. | H02J 3/32 700/295 |
| 2014/0039699 A1* | 2/2014 | Forbes, Jr. | G05B 19/02 700/286 |

FOREIGN PATENT DOCUMENTS

| | | |
|---|---|---|
| JP | 2011-142790 | 7/2011 |
| JP | 2012-44740 | 3/2012 |
| JP | 2012-244828 | 12/2012 |
| JP | 2013-13240 | 1/2013 |
| WO | WO 2009/141651 A2 | 11/2009 |
| WO | WO 2012/063800 A1 | 5/2012 |
| WO | WO 2013/002194 A1 | 1/2013 |

OTHER PUBLICATIONS

T. Senjyu et al., "Coordinate Control of Wind Turbine and Battery in Wind Turbine Generator System", IEEJ Transactions on Power and Energy, vol. 129, No. 5, pp. 653-660, May 2009.
International Search Report dated Jan. 14, 2014 in corresponding PCT International Application.
Decision to Grant Patent dated Jan. 30, 2018, Issued by the Japanese Patent Office in counterpart Japanese Patent Application No. 2015-501281.

* cited by examiner

POWER FLOW CONTROL SYSTEM AND POWER FLOW CONTROL METHOD

CROSS-REFERENCE TO RELATED PATENT APPLICATIONS

This application is a National Stage Entry of International Application No. PCT/JP2013/082593, filed Dec. 4, 2013, which claims priority from Japanese Patent Application No. 2013-029870, filed Feb. 19, 2013. The entire contents of the above-referenced applications are expressly incorporated herein by reference.

TECHNICAL FIELD

The present invention relates to a power flow control system that controls power flow, and more particularly to a power flow control system that controls power flow that flows through a distribution line that is connected to renewable power sources that use renewable energy to generate electric power.

BACKGROUND ART

Recent years have witnessed the proliferation of renewable power sources that use renewable energy such as solar energy to generate electric power. The electric power that is generated by a renewable power source can both be consumed by the consumer who has installed the renewable power source, and can also be supplied by way of a distribution line to a higher-order system such as a power transmission network. However, the amount of power generated by a renewable power source fluctuates due to, for example, the amount of solar radiation, and the electric power that is supplied to the higher-order system therefore fluctuates, thereby raising the problem of instability of the electric power that flows to the higher-order system.

As a technology for solving the above-described problem, technology has been proposed for stabilizing fluctuation in power flow at a higher-order system linking node at which a distribution line links with a higher-order system (such as a microgrid or an electric power substation that is under the control of an electric power distribution business). More specifically, a technology has been proposed for stabilizing fluctuation of power flow at a higher-order power system linking node by measuring the fluctuation of power flow at the higher-order power system linking node, and based on the measured value, regulating the amount of charging and discharging of a power storage device that is connected to the distribution line or by regulating the amount of power consumption of a controllable load that is connected to the distribution line (for example, refer to Patent Document 1).

In the above-described technology, the installation location at which a power storage device or controllable load is installed is limited by such factors as the availability of installation space and by the degree to which voltage on the distribution line is stable. As a result, a power storage device or controllable load may be installed at a location that is remote from the higher-order power system linking node. In such cases, the power storage device or controllable load will be installed at a location that is distant from the device that measures the fluctuation of power flow at the higher-order power system linking node, and the need will therefor arise for the long-distance transmission of the control signals for regulating the amount of charging/discharging of the power storage device or the amount of power consumption of the controllable load. Although the transmission distance of the control signals will vary with the size of the area in which the distribution line is installed, in general, the transmission distance will range in the order of from several hundred meters to several kilometers or more.

When control signals are transmitted over a long-distance, they will be prone to delays or interruptions. Delays or interruptions of the control signals will impede the accurate control of power flow fluctuation, and the reliability of the control of power flow fluctuation will therefore drop. The installation of a dedicated circuit for control signals may be considered as a means to limit the delay or interruption of control signals, but when the installation of power storage devices or controllable loads is distributed among individual consumers, the number of transmission destinations of the control signals may rise to the order of several thousand, and the installing dedicated circuits for all of these consumers will be problematic.

In response to these problems, Non-Patent Document 1 discloses a technology in which a power storage device or controllable load is combined with each renewable power source and the combined power storage devices or controllable loads are then used to control the fluctuation of electric power that is generated at the renewable power source for each individual renewable power source. In this technology, control of power flow fluctuation can be realized with a high level of reliability because power flow fluctuation can be controlled without requiring long-distance transmission of control signals.

LITERATURE OF THE PRIOR ART

Patent Documents

Patent Document 1: Japanese Unexamined Patent Application Publication No. 2008-263706

Non-Patent Documents

Non-Patent Document 1: Senjyu Tomonobu et al. "Coordinate Control of Wind Turbine and Battery in Wind Turbine Generator System." IEEJ Transactions on Power and Energy 129 (5), 653-660, 2009-05-01

SUMMARY OF THE INVENTION

Problem to be Solved by the Invention

Nevertheless, in the technology described in Non-Patent Document 1, power storage devices or controllable loads must be combined with all renewable power sources, and it is therefore not possible to control power flow fluctuation arising in a renewable power source that has not been combined with a power storage device or a controllable load, such as a renewable power source that has already been installed. Accordingly, the technology disclosed in Non-Patent Document 1 suffers from the problem of limited applicability.

When a plurality of renewable power sources is connected to a distribution line, fluctuation in the amount of generated power of each individual renewable power source brings about a "smoothing effect" that mitigates the fluctuation of the total generated power amount, which is the amount of generated power of all of the renewable power sources. As a result, the method described in Non-Patent Document 1 entails such problems as increasing the number of unnecessary processes such as controlling the fluctuation in the amount of generated power of each renewable power source even though the total generated power amount is already stabilized or such as requiring power storage devices that have more capacity than is necessary.

The present invention was realized in view of the above-described problems and has the object of providing a power flow control system and a power flow control method that can improve the reliability and wide applicability of the control of power flow fluctuation.

Means for Solving the Problem

The power flow control system according to the present invention is provided with: a power-varying device that changes the distribution line power amount, which is a value of the power flow that flows in a distribution line that is connected to a plurality of power sources that generate electric power; a measurement device that measures an index value that relates to the total generated power amount that is the sum total of the amount of generated power that is generated in each power source; and a calculation device that estimates the total generated power amount based on the index value and, in accordance with the estimation result, regulates the amount of change of the distribution line power amount that is changed by the power-varying device.

The power flow control method according to the present invention is a power flow control method realized by a power flow control system that is provided with a power-varying device that changes the amount of distribution line power that is a value of the power flow that flows in a distribution line connected to a plurality of power sources that generate electric power, the power flow control method including steps of: measuring an index value that relates to the total generated power amount that is the total amount of generated power that is generated in each power source; based on this index value, estimating the total generated power amount; and in accordance with this estimation result, regulating the amount of change of the amount of distribution line power that is changed by the power-varying device.

Effect of the Invention

The present invention enables an improving the reliability of controlling power flow fluctuation and creating wide applicability for systems that control power flow of fluctuation.

MODE FOR CARRYING OUT THE INVENTION

Exemplary embodiments of the present invention are next described with reference to the accompanying drawings. In each of the exemplary embodiments described hereinbelow, components having the same functions are given the same reference numbers and redundant explanation of these components may be omitted.

First Exemplary Embodiment

Figure 1:
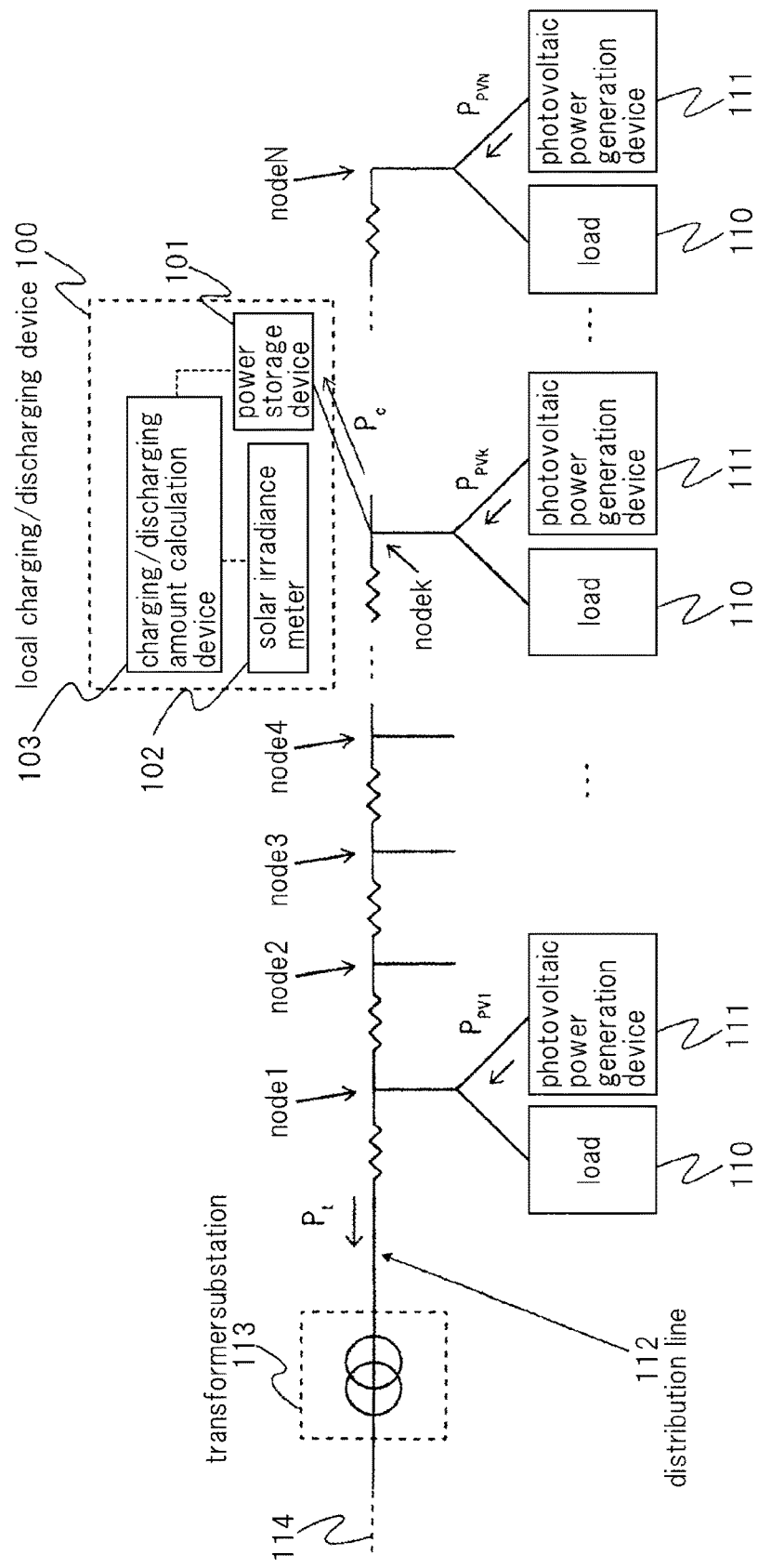
FIG. 1 shows the power flow control system of the first exemplary embodiment of the present invention.

FIG. 1 shows the power flow control system of the first exemplary embodiment of the present invention. The power flow control system shown in FIG. 1 has a configuration in which local charging/discharging devices 100, loads 110, and photovoltaic power generation devices 111 that are installed for each consumer of commercial power are connected to distribution line 112.

In FIG. 1, load 110 and photovoltaic power generation device 111 of each consumer are connected to a respective node of a plurality of nodes 1-N of distribution line 112, and nodes may also be present that are not connected to load 110 and photovoltaic power generation device 111.

Load 110 is a power-consuming device that consumes electric power. Photovoltaic power generation device 111 is a power source that uses solar energy to generate electric power. The power source is not limited to photovoltaic power generation device 111 and may also be any device that is capable of generating electric power such as a renewable power source including a wind power generation device that uses wind energy to generate electric power.

Distribution line 112 is a lower-order system that is connected to higher-order system 114 such as an electric power network by way of transformer substation 113 that converts voltage. The voltage in higher-order system 114 is assumed to be a higher voltage than the voltage in distribution line 112. In addition, transformer substation 113 is a higher-order system linking node that links distribution line 112 to higher-order system 114.

In the present exemplary embodiment, local charging/discharging device 100 is connected to any node (shown as node k in FIG. 1) of distribution line 112 but may also be connected to distribution line 112 at a location other than nodes 1-N. In FIG. 1, only one local charging/discharging device 100 is shown, but there may also be a plurality of local charging/discharging devices 100.

Local charging/discharging device 100 is fluctuation control device that controls, of the amount of fluctuation of power flow $P_t$ of the power flow in transformer substation 113, fluctuation relating to the total generated power amount, which is the sum total of the amount of generated power that is generated in each of photovoltaic power generation devices 111. If the amount of generated power of the $m^{th}$ photovoltaic power generation device 111 is assumed to be $P_{PVm}$, the total generated power amount $P_{PV\text{-}TOTAL}$ is represented by Formula 1 below:

$$P_{PV\text{-}TOTAL} = \sum_{m=1}^{N} P_{PVm} \qquad \text{Formula 1}$$

Local charging/discharging device 100 includes power storage device 101, solar irradiance meter 102, and charging/discharging amount calculation device 103.

Power storage device 101 is a power-varying device that is connected to distribution line 112 and that, by carrying out charging/discharging, changes the amount of distribution line power, which is a value of the power flow that flows in distribution line 112. More specifically, power storage device 101 receives charging/discharging commands that indicate a charging/discharging amount that is the amount of electric power to be charged/discharged, and carries out charging/discharging in accordance with the charging/discharging commands. Power storage device 101 can be constituted using a storage cell such as a lithium-ion battery, a nickel-hydrogen battery, or a sodium-sulfur battery. The power-varying device is not limited to power storage device 101 and may be any controllable load device that consumes power and in which the amount of power consumption can be regulated.

Solar irradiance meter 102 is a measurement device that measures the amount of solar irradiation as an index value that relates to the total generated power amount, which is the total amount of generated power that is generated in each photovoltaic power generation device 111. In place of solar irradiance meter 102, local charging/discharging device 100 may also be provided with a measurement device that measures as the index value the amount of generated power of any photovoltaic power generation device 111 that is connected to distribution line 112 or the amount of generated power of a nearby photovoltaic power generation device that is not connected to distribution line 112.

Charging/discharging amount calculation device 103 estimates the total generated power amount of photovoltaic power generation devices 111 based on the amount of solar radiation that was measured in solar irradiance meter 102. At this time, charging/discharging amount calculation device 103 estimates the total generated power amount by calculating, for the amount of solar irradiation, a conversion coefficient such as the total equipment capacity, which is the sum total of the equipment capacity of each photovoltaic power generation device 111, or the average conversion efficiency, which is the average value of the conversion efficiency of each photovoltaic power generation device 111.

Having estimated the total generated power amount, charging/discharging amount calculation device 103 regulates the amount of charging/discharging that is to be charged/discharged in power storage device 101 in accordance with this estimation result as the amount of change in distribution line power amount that power storage device 101 is to change. When controllable load is used in place of power storage device 101, charging/discharging amount calculation device 103 may regulate, as the amount of change in the distribution line power amount that is to be changed by power storage device 101, the amount of power consumption that is to be consumed by the controllable load in accordance with the estimation result of the total generated power amount.

The operation of the power flow control system of the present exemplary embodiment is next described.

Figure 2:
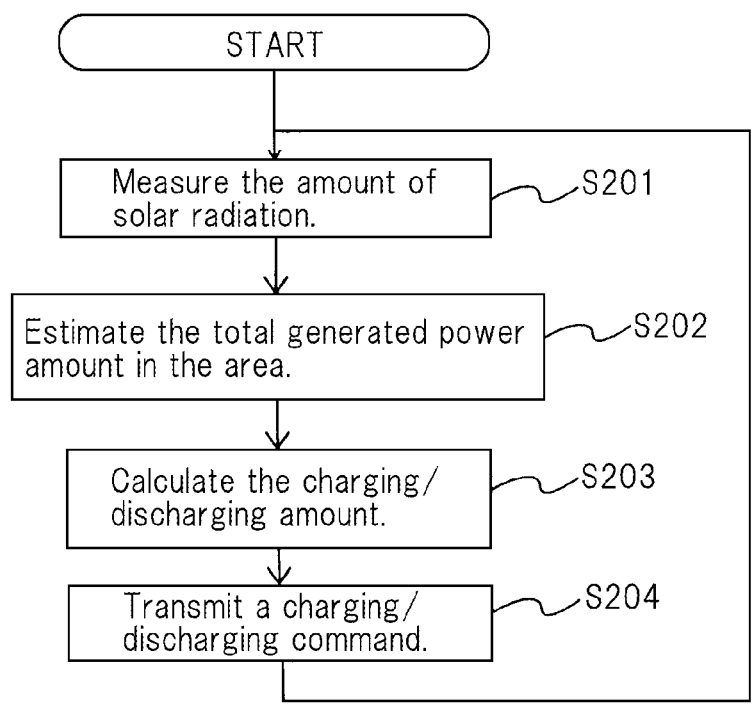
FIG. 2 is a flow chart for describing an example of the operation of the power flow control system of the first exemplary embodiment of the present invention.

FIG. 2 is a flow chart for describing an example of the operation of the power flow control system of the present exemplary embodiment.

First, in Step S201, charging/discharging amount calculation device 103 receives the amount of solar irradiation from solar irradiance meter 102. Solar irradiance meter 102 is assumed to measure the amount of solar irradiation at fixed intervals and then notify charging/discharging amount calculation device 103.

In Step S202, charging/discharging amount calculation device 103 next estimates the total generated power amount of photovoltaic power generation devices 111 from the amount of solar irradiation that was received. More specifically, because the length of distribution line 112 in the area in which distribution line 112 is installed is normally in the order of several kilometers, the amount of solar irradiation can be considered to be substantially uniform. As a result, the amount of solar irradiation that is measured by solar irradiance meter 102 can be applied in common to each of the photovoltaic power generation devices 111 that are connected to distribution line 112. Accordingly, charging/discharging amount calculation device 103 can use equipment information that indicates a statistical value of each photovoltaic power generation device 111 to estimate the total generated power amount based on the amount of solar irradiation.

The equipment information indicates, for example, the total equipment capacity that is the sum total of the equipment capacity of each photovoltaic power generation device 111 and the average conversion efficiency that is the average value of the conversion efficiency of each photovoltaic power generation device 111. More specifically, the conversion efficiency of photovoltaic power generation device 111 is the efficiency of the conversion of the solar energy to electrical energy. In addition, the equipment information is assumed to be held in charging/discharging amount calculation device 103. Still further, the equipment information that is held in charging/discharging amount calculation device 103 is assumed to be updated either at regular intervals or as necessary according to changes in the number of photovoltaic power generation devices 111 that are connected to distribution line 112.

When the equipment information indicates the total equipment capacity and the average conversion efficiency, charging/discharging amount calculation device 103 estimates, for example, the product of the total equipment capacity, the average conversion efficiency, and the amount of solar irradiation as the total generated power amount. Essentially, if $P_{RATED-PV-TOTAL}$ is the total equipment capacity, $R_{AVG}$ is the average conversion efficiency, and $I_{Irradiation}$ is the amount of solar radiation, charging/discharging amount calculation device 103 uses the following Formula 2 to estimate the total generated power amount $P_{PV-TOTAL}$.

$$P_{PV-TOTAL} = P_{RATED-PV-TOTAL} \times R_{AVG} \times I_{Irradiation} \quad \text{Formula 2}$$

The average conversion efficiency may be a fixed value or may be a value that varies according to circumstances. For example, the average conversion efficiency changes according to the direction of irradiation, and the equipment information may therefore indicate the average conversion efficiency for each irradiation direction. In this case, charging/discharging amount calculation device 103 specifies the irradiation direction based on the time and date and then uses the average conversion efficiency that accords with the specified irradiation efficiency to estimate the total generated power amount.

In addition, because there is a possibility that photovoltaic power generation devices 111 will be in shade, according to the time zone, such photovoltaic power generation devices 111 may also be considered. In such cases, the equipment information indicates average conversion efficiency as a function of time, and charging/discharging amount calculation device 103 uses an average conversion efficiency that accords with the time to estimate the total generated power amount. The average conversion efficiency becomes lower in time zones in which there are photovoltaic power generation devices 111 that are in the shade.

In the interest of simplification, the total generated power amount and the amount of solar irradiation are in a proportional relation in Formula 2, but the total generated power amount and the amount of solar irradiation are not necessarily proportional. As a result, charging/discharging amount calculation device 103 may use function f to estimate the total generated power amount. Function f is determined from, for example, the properties of each photovoltaic power generation device 111.

$$P_{PV\text{-}TOTAL} = f(P_{RATED\text{-}PV\text{-}TOTAL}, R_{AVG}, I_{Irradiation}) \quad \text{Formula 3}$$

When the generated power amount of photovoltaic power generation device 111 is used as the index value, this generated power amount fluctuates rapidly according to minute changes of, for example, the amount of solar irradiation, and the fluctuation of the generated power amount of photovoltaic power generation device 111 therefore includes a high-frequency component. In this case, even though each photovoltaic power generation device 111 may be established in a range in the order of the several kilometers in which distribution line 112 is provided, variations will occur in the high-frequency component in the fluctuation of the generated power amount of each photovoltaic power generation device 111 and the relation between the total generated power amount and the amount of solar irradiation will be complex. Nevertheless, the "smoothing effect" that cancels out the high-frequency components contained in the fluctuation of the generated power amount of each photovoltaic power generation device 111 will eliminate the high-frequency fluctuation of the total generated power amount. Accordingly, a high-pass filter may be applied to the signal that indicates the generated power amount that is measured as the index amount to improve the estimation accuracy of the total generated power amount.

In Step S203, charging/discharging amount calculation device 103 next, according to the estimation result that was estimated in Step S202, calculates the charging/discharging amount of power storage device 101 so as to control, of the amount of fluctuation of power flow $P_f$, the amount of fluctuation of power flow arising from the fluctuation of the total generated power amount.

For example, charging/discharging amount calculation device 103 may calculate the charging/discharging amount such that the electric power of the total generated power amount that is the estimation result is all charged to power storage device 101, may take, as the charging/discharging amount, the differential electric power amount obtained by subtracting a target amount of electric power from the total generated power amount to make the amount of electric power supplied to higher-order system 114 the target amount of electric power, or may calculate the charging/discharging amount by another method. When the differential electric power amount is taken as the charging/discharging amount, the charging/discharging amount indicates charging of only the differential electric power amount when the differential electric power amount is positive, and the charging/discharging amount indicates discharging of only an absolute value portion of the differential electric power amount when the differential electric power amount is negative. The target generated power amount may be a constant or may be calculated based on, for example, the result of predicting the generated power of that day or a moving average of the total generated power amount.

In Step S204, charging/discharging amount calculation device 103 generates a charging/discharging command that indicates the charging/discharging amount that was calculated and transmits the charging/discharging command to power storage device 101 to regulate the charging/discharging amount of power storage device 101. Charging/discharging amount calculation device 103 then returns to Step S201.

Although there was only one local charging/discharging device 100 in the above-described operations, the same operations are carried out as described above when there is a plurality of local charging/discharging devices 100. However, the average conversion efficiency for estimating the total generated power amount in Step S202 differs from the above-described example. More specifically, where there is a plurality of local charging/discharging devices 100, a value obtained by multiplying the above-described average conversion efficiency by a coefficient that is determined according to the characteristics of power storage device 101 is used as the average conversion efficiency for use when estimating the total generated power amount. This coefficient is set such that the total of the coefficients of each local charging/discharging device 100 is equal to 1. According to one method that can be offered as the method of determining this coefficient, the coefficient of each local charging/discharging device 100 is determined such that the coefficient of each local charging/discharging device 100 is proportional to the equipment capacity of power storage device 101.

When another power source is used in place of photovoltaic power generation device 111, the index value can be altered according to the power source. For example, if a wind power generation device is used instead of photovoltaic power generation device 111, local charging/discharging device 100 is provided with an anemometer that measures the wind speed as the index value instead of solar irradiance meter 102, and charging/discharging amount calculation device 103 is able to estimate the total generated power amount based on the wind speed that is measured by the anemometer.

According to the present exemplary embodiment as described hereinabove, an index value is measured that relates to the total generated power amount that is the sum total amount of power generated in each photovoltaic power generation device 111, and the charging/discharging amount of power storage device 101 is regulated based on this index value. As a result, the power flow fluctuation can be controlled even though a measurement device for measuring power flow fluctuation is not provided at each higher-order system linking node, whereby the need for long-distance transmission is eliminated. In addition, there is no need to combine power storage device 101 with each photovoltaic power generation device 111. Accordingly, the reliability and wide applicability of the control of fluctuation of power flow can be improved.

Second Exemplary Embodiment

Figure 3:
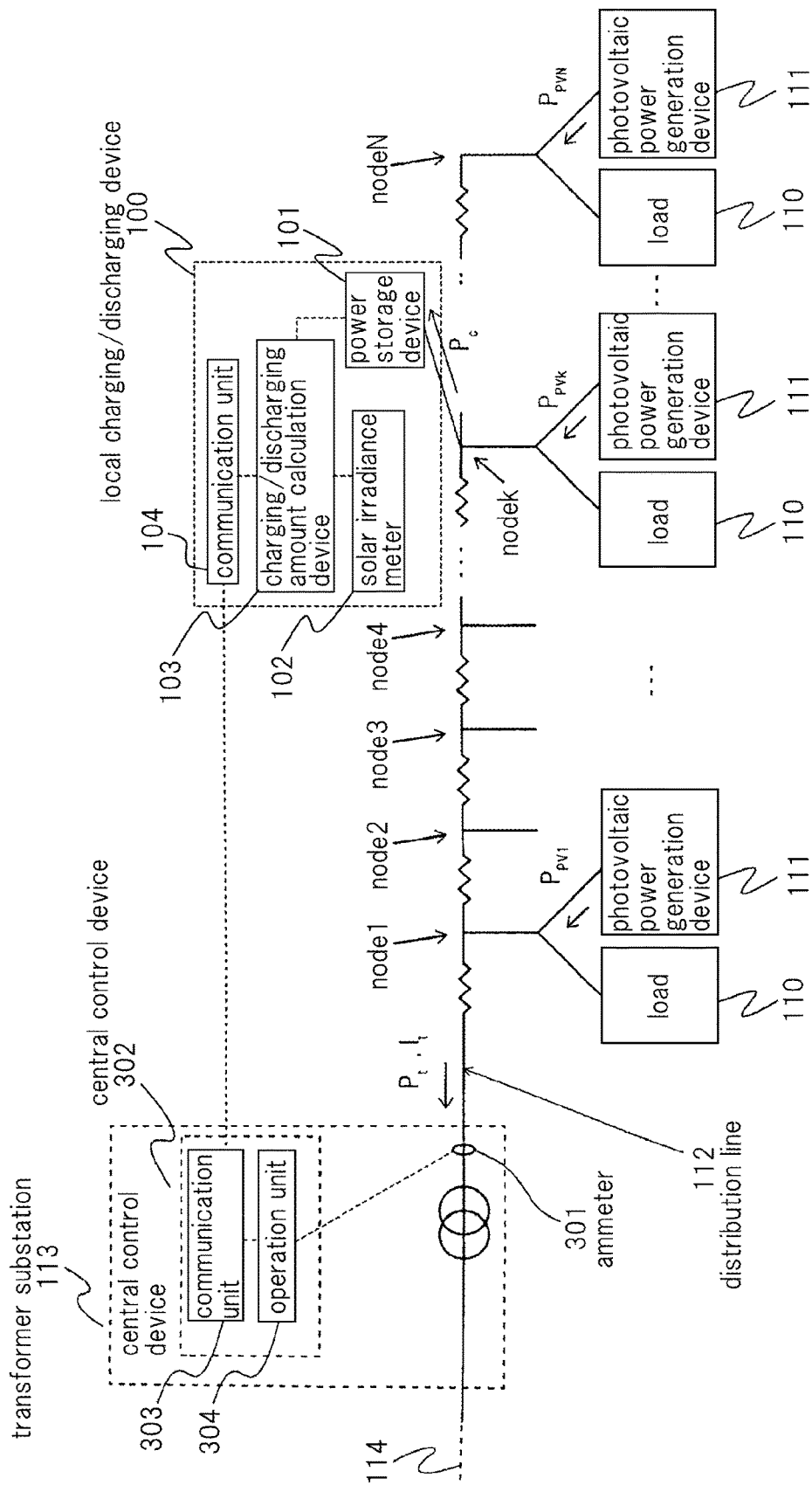
FIG. 3 shows the power flow control system of the second exemplary embodiment of the present invention.

FIG. 3 shows the configuration of the power flow control system of the second exemplary embodiment of the present invention. The power flow control system shown in FIG. 3 differs from the configuration shown in FIG. 1 in that ammeter 301 and central control device 302 have been added inside transformer substation 113 and local charging/discharging device 100 is further provided with communication unit 104.

In addition, charging/discharging amount calculation device 103 of the present exemplary embodiment estimates the total generated power amount $P_{PV\text{-}TOTAL}$ by calculating (more specifically, by multiplying) conversion coefficient C by the solar irradiation amount $I_{Irradiation}$ that is measured by solar irradiance meter 102.

$$P_{PV\text{-}TOTAL} = C \times I_{Irradiation} \quad \text{Formula 4}$$

Here, C is the conversion coefficient. The conversion coefficient is altered according to an alteration command from central control device 302. More specifically, communication unit 104 communicates with central control device 302 and receives an alteration command indicating the conversion coefficient that follows alteration from central control device 302. Charging/discharging amount calculation device 103 then alters the conversion coefficient according to the alteration command that was received by communication unit 104.

Ammeter 301 measures the value of the current that flows to transformer substation 113, which is the higher-order system linking node. In other words, ammeter 301 measures the value of the current of the electric power that is transmitted to and received from higher-order system 114 ($I_t$ in FIG. 3) at regular intervals and reports the value of the current that was measured to central control device 302.

Central control device 302 includes communication unit 303 and operation unit 304.

Communication unit 303 carries out communication with local charging/discharging device 100.

Operation unit 304 receives the current value from ammeter 301, and based on this current value, measures the amount of fluctuation in a fixed time interval (for example, from several second to several hours) of the electric power at the higher-order system linking node, i.e., the electric power that is transmitted to or received from higher-order system 114. Operation unit 304 then, based on the measured amount of fluctuation, alters the conversion coefficient that charging/discharging amount calculation device 103 uses for estimating the total generated power amount. More specifically, operation unit 304 determines the conversion coefficient according to the amount of fluctuation and then alters the conversion coefficient by generating and transmitting an alteration command that indicates the conversion coefficient that was determined to local charging/discharging device 100 by way of communication unit 303.

Figure 4:
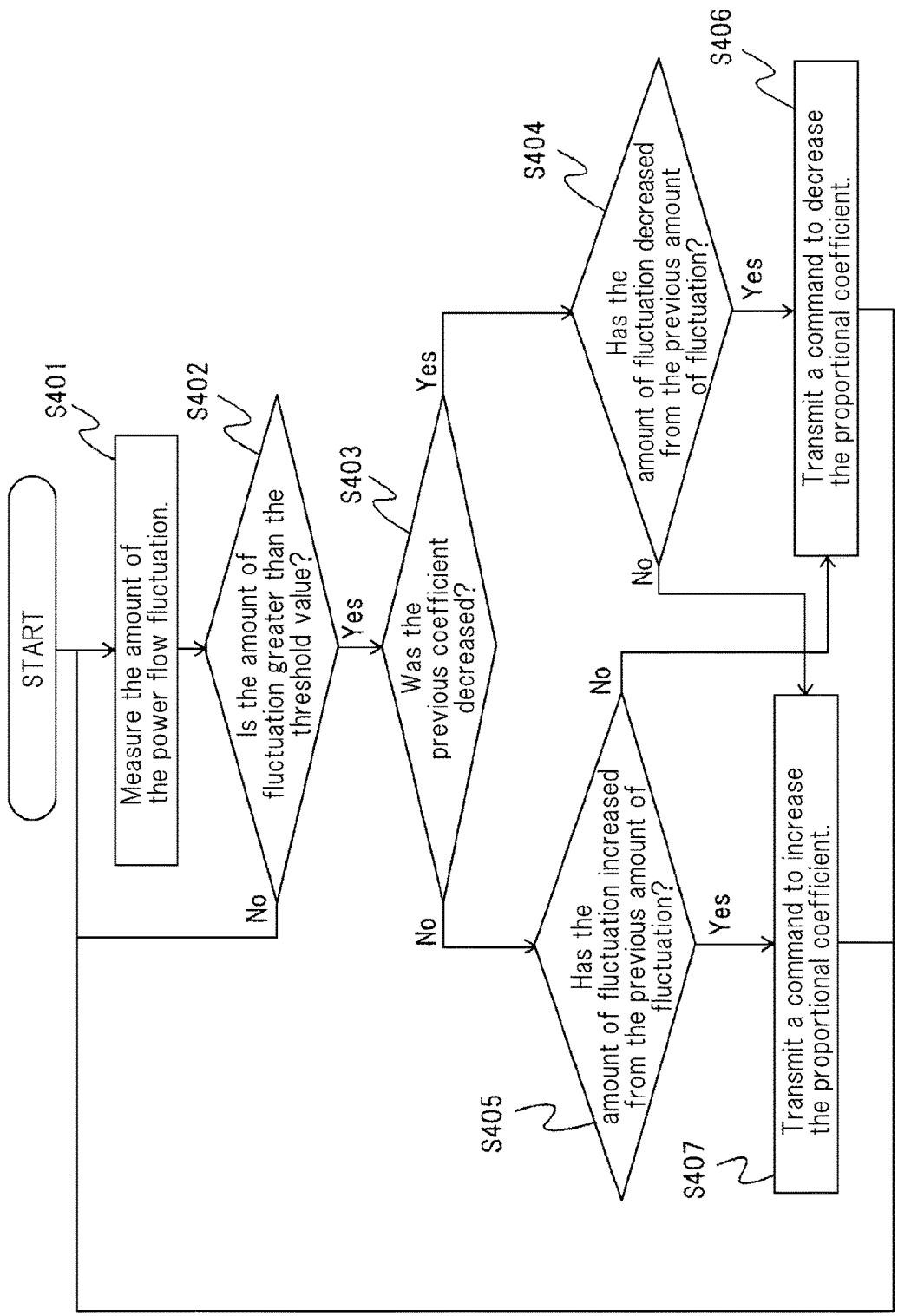
FIG. 4 is a flow chart for describing an example of the operation of the central control device in the power flow control system of the second exemplary embodiment of the present invention.

FIG. 4 is a flow chart for describing an example of the operation of central control device 302 in the power flow control system of the present exemplary embodiment.

In Step S401, operation unit 304 first receives a current value from ammeter 301, and based on this current value, measures the amount of fluctuation of power flow $P_t$ in a fixed time interval by monitoring power flow $P_t$ over the fixed time interval.

If the amounts of consumed power that are consumed by load 110 of each consumer are $L_1, L_2, \ldots, L_N$, then the power flow $P_t$ will be represented by the following Formula 5.

$$P_t = \sum_{m=1}^{N} L_m + \sum_{m=1}^{N} P_{PVm} \quad \text{Formula 5}$$

Of the amount of fluctuation of power flow $P_t$, the fluctuations of the terms of $\Sigma L_m$ relating to load 110 differ for each individual consumer and therefore cancel each other out. As a result, the first term of Formula 5 can be considered to be fixed. Accordingly, the amount of fluctuation of power flow $P_t$ can be considered to be the amount of fluctuation arising in the second term of Formula 5, i.e., the amount of fluctuation of the total generated power amount of photovoltaic power generation device 111.

In Step S402, operation unit 304 next judges whether the amount of fluctuation of the power flow that was measured in Step S401 is greater than a predetermined threshold value.

If the amount of fluctuation of power flow is equal to or less than the threshold value, operation unit 304 judges that the present conversion coefficient is an appropriate value and returns to the process of Step S401. However, if the amount of fluctuation of power flow is greater than the threshold value, operation unit 304 judges that the present conversion coefficient is not an appropriate value and proceeds to the process of Step S403.

In Step S403, operation unit 304 judges whether the conversion coefficient was altered at the time of the previous alteration of the conversion coefficient such that the total generated power amount that was estimated by charging/discharging amount calculation device 103 will decrease.

In the present exemplary embodiment, the total generated power amount is estimated by multiplying the solar irradiation amount by the conversion coefficient, and operation unit 304 therefore is able to judge whether the conversion coefficient was altered such that the total generated power amount will decrease by judging whether the conversion coefficient was decreased at the time of the previous alteration of the conversion coefficient.

Operation unit 304 proceeds to the process of Step S404 if the conversion coefficient was decreased at the time of the previous alteration of the conversion coefficient, and proceeds to the process of Step S405 if the conversion coefficient was increased at the time of the previous alteration of the conversion coefficient.

In Step S404, operation unit 304 judges whether the amount of fluctuation that was measured in this instance has decreased compared to the amount of fluctuation that was previously measured. On the other hand, as in Step S404, operation unit 304 also judges in Step S405 whether the amount of fluctuation that was measured in this instance has decreased compared to the amount of fluctuation that was previously measured.

If operation unit 304 determines that the amount of fluctuation has decreased in Step S404, and further, if operation unit 304 judges that the amount of fluctuation has increased in Step S405, operation unit 304 proceeds to the process of Step S406. If operation unit 304 determines that the amount of fluctuation has increased in Step S404, and further, determines that the amount of fluctuation has decreased in the process of Step S405, operation unit 304 proceeds to Step S407.

In Step S406, operation unit 304 generates an alteration command indicating a conversion coefficient smaller than the current conversion coefficient, notifies local charging/discharging device 100 by way of communication unit 303, and then returns to the process of Step S401.

On the other hand, in Step S407, operation unit 304 generates an alteration command indicating a larger conversion coefficient than the current conversion coefficient, notifies local charging/discharging device 100 by way of communication unit 303, and then returns to the process of Step S401.

The alteration command may indicate the amount of alteration of the conversion coefficient, or may directly indicate the value of the conversion coefficient following alteration. Further, the amount of alteration of the conversion coefficient may be a fixed value or may be determined in operation unit 304 according to the magnitude of the amount of fluctuation.

Figure 5:
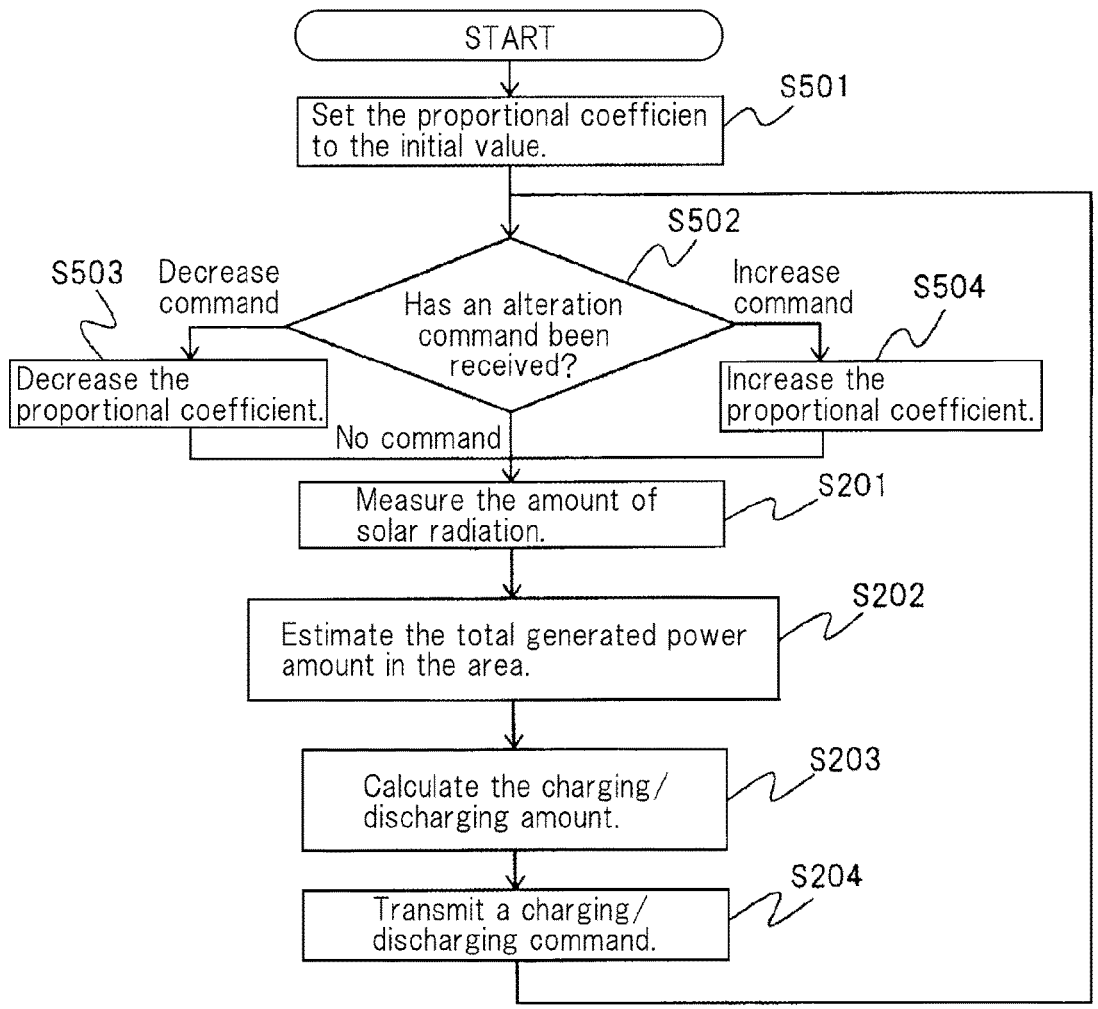
FIG. 5 is a flow chart for describing an example of the operation of the local charging/discharging device in the power flow control system of the second exemplary embodiment of the present invention.

FIG. 5 is a flow chart for describing the operation of local charging/discharging device 100 in the power flow control system of the present exemplary embodiment.

First, in Step S501, charging/discharging amount calculation device 103 sets the conversion coefficient to a predetermined initial value.

In Step S502, charging/discharging amount calculation device 103 next checks whether communication unit 104 has received an alteration command, and if communication unit 104 has received an alteration command, checks whether the alteration command indicates decrease of the conversion coefficient.

When the alteration command indicates increase of the conversion coefficient, charging/discharging amount calculation device 103 proceeds to the process of Step S503 and increases the conversion coefficient in accordance with the alteration command.

When the alteration command indicates decrease of the conversion coefficient, charging/discharging amount calculation device 103 proceeds to the process of Step S504 and decreases the conversion coefficient in accordance with the alteration command.

When an alteration command has not been received, after Step S503 has been completed, and after Step S504 has been completed, the processes of Steps S201-S204 are executed as in the first exemplary embodiment. However, the processing differs from the first exemplary embodiment regarding the point of using Formula 4 in Step S202 when charging/discharging amount calculation device 103 estimates the total generated power amount. In addition, after the process of Step S204 has been completed, the process of Step S502 is executed.

Where there is a plurality of local charging/discharging devices 100, a value derived by multiplying the above-described conversion coefficient by a coefficient that is determined according to the characteristics of power storage device 101 is used as the conversion coefficient employed when estimating the total generated power amount. This coefficient is set such that the sum total of the coefficients of each local charging/discharging device 100 equals 1. As a method of determining this coefficient, a method of determining the coefficient of each local charging/discharging device 100 can be offered in which the coefficient of each local charging/discharging device 100 is proportional to the equipment capacity of power storage device 101.

According to the present exemplary embodiment as described above, a conversion coefficient for estimating the total generated power amount by performing a mathematical operation on the solar irradiation amount is altered based on the amount of fluctuation of the power flow in a fixed time interval. As a result, the accuracy of estimation of the total generated power amount can be improved, and a further improvement can be achieved in the reliability of controlling the power flow fluctuation.

Assuming that the measurement time interval of the amount of fluctuation of the power flow is from several seconds to several hours in duration, the alteration command is reported to local charging/discharging device 100 from central control device 302 at the rate of on time within a period of several seconds to several hours. In this case, the communication frequency is lower than in a case in which the charging/discharging amount is reported directly to local charging/discharging device 100 from central control device 302, and in addition, the charging/discharging amount of power storage device 101 is adjusted as appropriate even if the alteration command is not reported. As a result, the effect of the controlling fluctuation of the total generated power amount is not greatly influenced despite the occurrence of delay or interruption of the communication of the alteration command, and the reliability of the control of fluctuation of power flow can therefore be ensured.

Third Exemplary Embodiment

Figure 6:
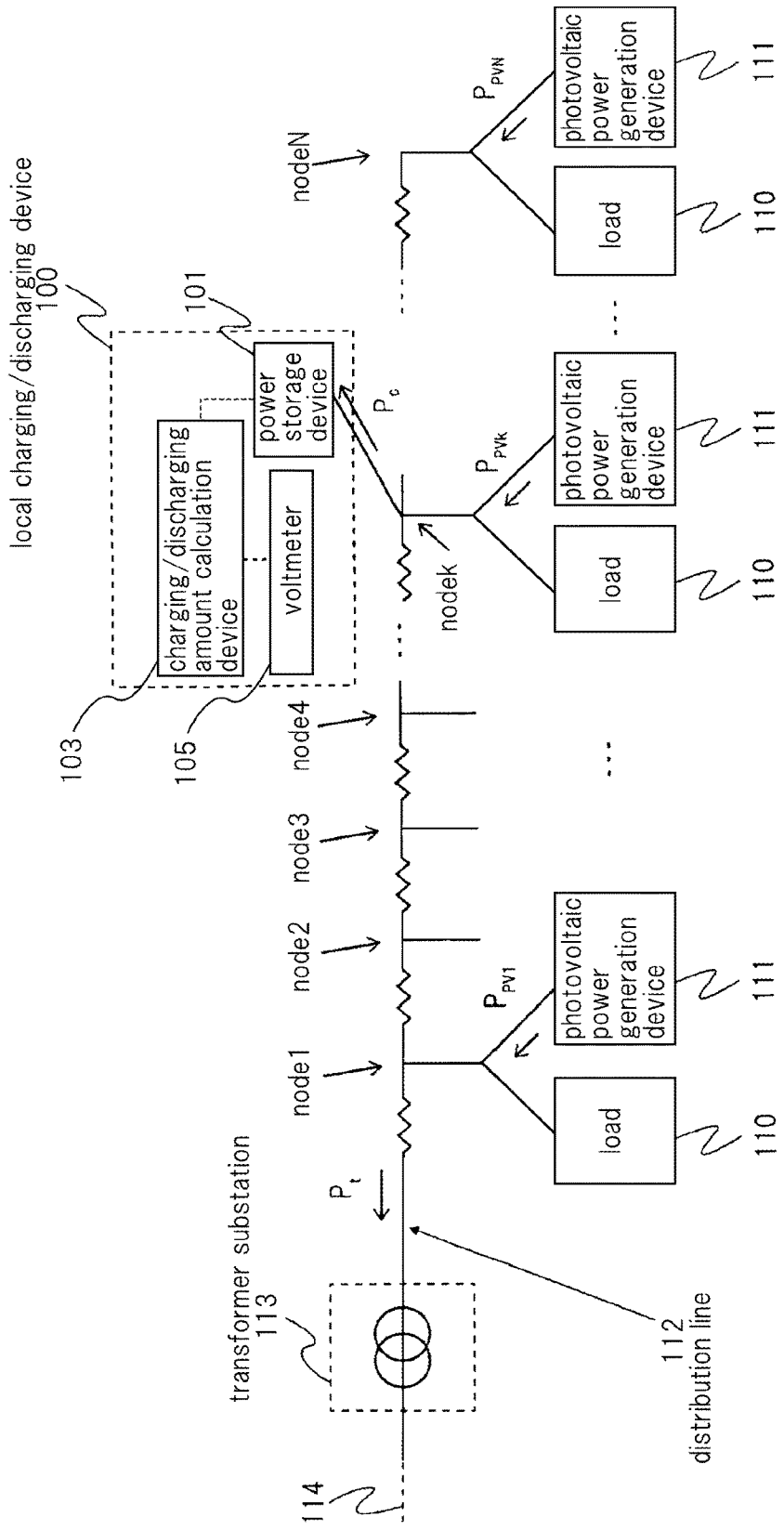
FIG. 6 shows the power flow control system of the third exemplary embodiment of the present invention.

FIG. 6 shows the discharging system of the third exemplary embodiment of the present invention. The power flow control system shown in FIG. 6 differs from the power flow control system shown in FIG. 1 in that local charging/discharging device 100 is provided with voltmeter 105 in place of solar irradiance meter 102.

Voltmeter 105 is a measurement device that measures, as the index value that relates to the total generated power amount of photovoltaic power generation device 111, the distribution line voltage value that is the voltage value of a designated location of distribution line 112. In the present exemplary embodiment, voltmeter 105 measures the voltage value at node k as the distribution line voltage value.

The distribution line voltage value $V_k$ of node k is represented by the following Formula 6.

$$V_k = V_0 + \sum_{l=1}^{k} Z_l \left( \sum_{m=l}^{N} i_{L\_m} + i_{RE\_m} \right) = $$

$$V_0 + \sum_{l=1}^{k} Z_l \left( \sum_{m=l}^{N} i_{L\_m} \right) + \sum_{l=1}^{k} Z_l \left( \sum_{m=l}^{N} i_{RE\_m} \right)$$

Formula 6

In Formula 6, $V_0$ indicates the voltage that is applied to the distribution line at transformer substation 113, $Z_m$ indicates the impedance between node m−1 and node m, $i_{L\#m}$ indicates the load current that is consumed at load 110 that is connected to node m, and $i_{RE\#m}$ indicates the current that is generated in the photovoltaic power generation equipment that is connected to node m.

In Formula 6, the first term $V_0$ on the right side that indicates the voltage applied to the distribution line at transformer substation 113 can be considered to be substantially constant. In addition, the term that includes $i_{L\#m}$ that is the second term on the right side is only the long-period fluctuation in the order of an hour due to the smoothing effect upon the load current among consumers. This type of long-period fluctuation is considered to be a constant because it can be eliminated through the use of technology (such as SVR (Static Voltage Regulator) or LRT (Load Ratio Control Transformer) that changes the step-down ratio of a transformer in a substation or distribution line) that has been used for stabilizing voltage since before the introduction of photovoltaic power generation.

Accordingly, the fluctuation that arises in the term that includes $i_{RE\#m}$ that is the third term on the right side represents the fluctuation of the power flow that arises in the total generated power amount of photovoltaic power generation device 111. In an area in the order of several kilometers, which is the length of one distribution line, the amount of generated power of each photovoltaic power generation device 111 is considered to be synchronized, and further, the fluctuation of this power is in the order of second periods at the shortest. As a result, in a time interval that is sufficiently shorter than the order of an hour, the distribution line voltage value Vk that is measured by voltmeter 105 of local charging/discharging device 100 is represented by the following Formula 7.

$V_k$=constant+an amount of fluctuation proportional to the sum total of a current amount supplied from each photovoltaic power generation device 111   Formula 7

In addition, because the voltage applied to the distribution line at transformer substation 113 is substantially fixed, the current value $I_t$, which is the value of the current that flows in transformer substation 113, should be stabilized in order to stabilize the power flow at transformer substation 113. Accordingly, the total generated power amount of photovoltaic power generation device 111 is represented by the following Formula 8.

$$P_{PV\text{-}TOTAL} = (V_k - C_1) \times C_2$$   Formula 8

Here, conversion coefficients $C_1$ and $C_2$ are held in charging/discharging amount calculation device 103 and are preferably updated periodically or according to necessity according to, for example, changes in the number of photovoltaic power generation devices 111 that are connected to distribution line 112. As the method of deriving conversion coefficients $C_1$ and $C_2$, a method can be provided in which conversion coefficients $C_1$ and $C_2$ are derived by calculating the power flow based on the number and locations of photovoltaic power generation devices 111 that are connected to distribution line 112 and then, based on these calculation results, calculating the correlation between the total generated power amount of photovoltaic power generation devices 111 and the distribution line voltage value.

Figure 7:
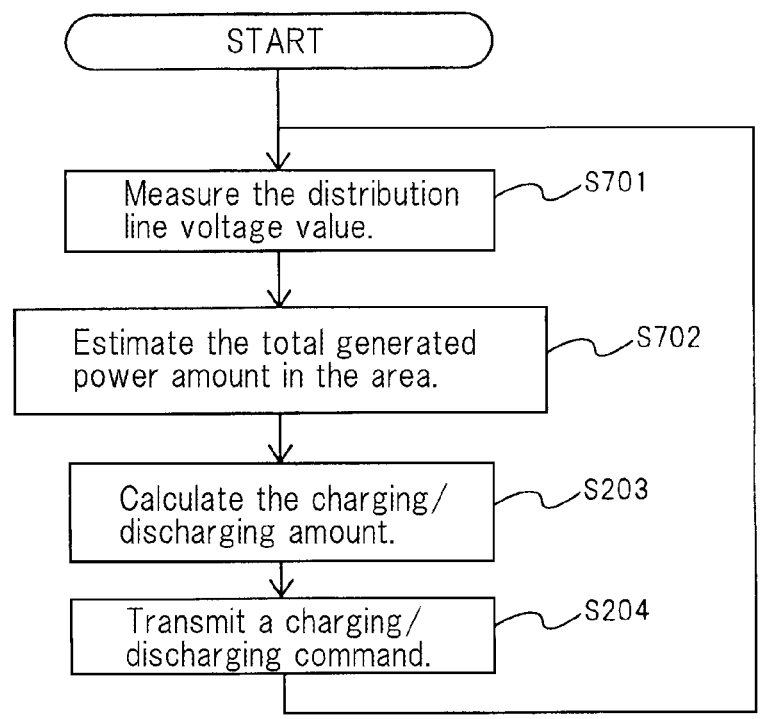
FIG. 7 is a flow chart for describing an example of the operation of the power flow control system of the third exemplary embodiment of the present invention.

FIG. 7 is a flow chart for describing an example of the operation of power flow control system of the present exemplary embodiment.

First, in Step S701, charging/discharging amount calculation device 103 receives the distribution line voltage value from voltmeter 105. Voltmeter 105 is assumed to periodically measure the distribution line voltage value and report the value to charging/discharging amount calculation device 103.

In Step S702, charging/discharging amount calculation device 103 next uses Formula 8 to estimate the total generated power amount based on the distribution line voltage value. Charging/discharging amount calculation device 103 then executes the processes of Steps S203 and S204 as in the first exemplary embodiment.

According to the present exemplary embodiment as described above, the distribution line voltage value is measured as the index value that relates to the total generated power amount that is the sum total of the amount of generated power in each photovoltaic power generation device 111, and the charging/discharging amount of power storage device 101 is regulated based on this distribution line voltage value. Accordingly, the reliability and wide applicability of the control of the fluctuation of power flow can be improved, as in the first exemplary embodiment Fourth Exemplary Embodiment FIG. 8 shows the power flow control system of the fourth exemplary embodiment of the present invention.

Figure 8:
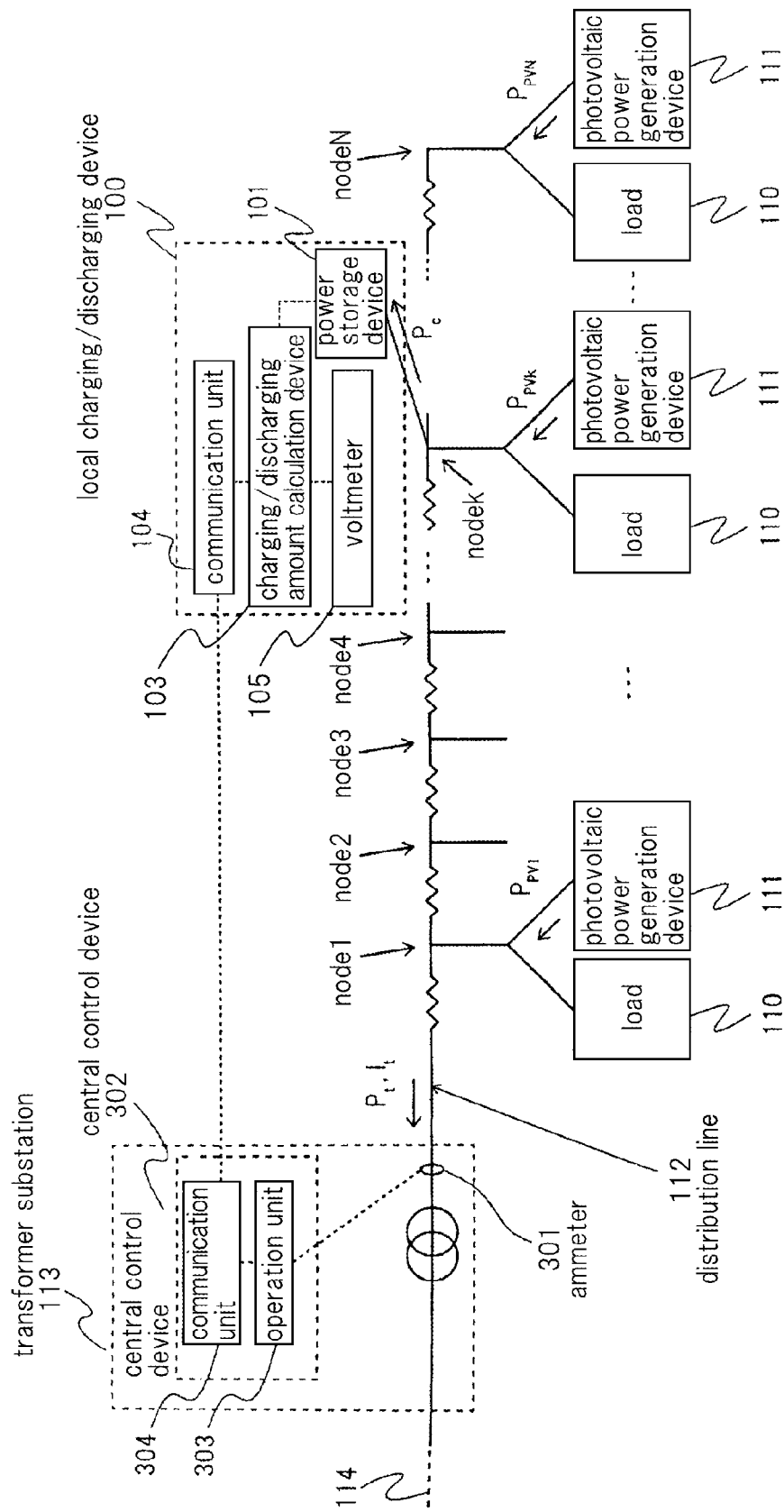
FIG. 8 shows the power flow control system of the fourth exemplary embodiment of the present invention.

The power flow control system shown in FIG. 8 differs from the power flow control system shown in FIG. 3 in that local charging/discharging device 100 is provided with voltmeter 105 in place of solar irradiance meter 102.

In addition, operation unit 304 transmits alteration commands of coefficients $C_1$ and $C_2$ instead of alteration commands of conversion coefficient C.

The operations of the power flow control system of the present exemplary embodiment may employ conversion coefficients $C_1$ and $C_2$ instead of conversion coefficient C in the operations described using FIG. 4, and may add the processes of Steps S501-S504 in FIG. 5 and use conversion coefficients $C_1$ and $C_2$ instead of conversion coefficient C in the operations described using FIG. 7.

In the present exemplary embodiment, as in the second exemplary embodiment, the accuracy of estimating the total generated power amount can be improved, whereby reliable control of power flow fluctuation can be further improved.

This application claims the benefits of priority based on Japanese Patent Application No. 2013-029870 for which application was submitted on Feb. 19, 2013 and incorporates by citation all of the disclosures of that application.

EXPLANATION OF REFERENCE NUMBERS 100 local charging/discharging device 100
101 power storage device
102 solar irradiance meter
103 charging/discharging amount calculation device
104 communication unit
110 load
111 photovoltaic power generation device
112 distribution line
113 transformer substation
114 higher-order system
301 ammeter
302 central control device
303 operation unit
304 communication unit

What is claimed is:

1. A power flow control system comprising:
    a power-varying device that changes the distribution line power amount, which is a value of the power flow that flows in a distribution line that is connected to a plurality of power sources that generate electric power, and to a higher-order system;
    a measurement device that measures an index value that relates to the total generated power amount that is the sum total of the amount of generated power that is generated in each power source;
    a calculation device that estimates said total generated power amount based on said index value, and in accordance with the estimation result, regulates the amount of change of said distribution line power amount that is changed by said power-varying device, wherein said calculation device uses a conversion coefficient to estimate said total generated power amount from said index value; and
    a control device that
        repeatedly measures an amount of power flow fluctuation in a fixed time interval that is sent to or received from said higher-order system,
        judges whether a most recent amount of fluctuation, which is said amount of fluctuation that was measured at a present time, has decreased compared to said amount of fluctuation that was previously measured,
        judges whether, at a time of the previous alteration of said conversion coefficient, the conversion coefficient was altered such that the total generated power amount that is estimated by said calculation device would decrease, and alters said conversion coefficient based on each judgment result, wherein said control device alters said conversion coefficient such that said total generated power amount will decrease when:

said most recent amount of fluctuation has decreased, and moreover, when said control device has altered said conversion coefficient said total generated power amount will decrease at the time of said previous alteration, and said most recent amount of fluctuation has increased, and moreover, when said control device has altered said conversion coefficient said total generated power amount will increase at the time of said previous alteration, and wherein said control device alters said conversion coefficient such that said total generated power amount will increase when:

said most recent amount of fluctuation has decreased, and moreover, when said control device has altered said conversion coefficient said total generated power amount will increase at the time of said previous alteration, and said most recent amount of fluctuation has increased, and moreover, when said control device has altered said conversion coefficient said total generated power amount will decrease at the time of said previous alteration.

2. The power flow control system as set forth in claim 1, wherein:

each power source is a photovoltaic power generation device; and said measurement device measures, as said index value, the amount of solar irradiance, the amount of power that is generated in said photovoltaic power generation device, or the voltage at a designated location of said distribution line.

3. The power flow control system as set forth in claim 1, wherein:

each power source is a photovoltaic power generation device; and said measurement device measures, as said index value, the amount of solar irradiance, the amount of power that is generated in said photovoltaic power generation device, or the voltage at a designated location of said distribution line.

4. The power flow control system as set forth in claim 1, wherein:

each power source is a photovoltaic power generation device; and said measurement device measures, as said index value, the amount of solar irradiance, the amount of power that is generated in said photovoltaic power generation device, or the voltage at a designated location of said distribution line.

5. The power flow control system as set forth in claim 1, wherein:

each power source is a photovoltaic power generation device; and said measurement device measures, as said index value, the amount of solar irradiance, the amount of power that is generated in said photovoltaic power generation device, or the voltage at a designated location of said distribution line.

6. The power flow control system as set forth in claim 1, wherein:

each power source is a photovoltaic power generation device; and said measurement device measures, as said index value, the amount of solar irradiance, the amount of power that is generated in said photovoltaic power generation device, or the voltage at a designated location of said distribution line.

7. The power flow control system as set forth in claim 1, wherein:

each power source is a wind power generation device, and said measurement device measures, as said index value, the wind speed, the amount of generated power that is generated in the wind power generation device, or the voltage at a designated location of said distribution line.

8. The power flow control system as set forth in claim 1, wherein:

each power source is a wind power generation device, and said measurement device measures, as said index value, the wind speed, the amount of generated power that is generated in the wind power generation device, or the voltage at a designated location of said distribution line.

9. The power flow control system as set forth in claim 1, wherein:

each power source is a wind power generation device, and said measurement device measures, as said index value, the wind speed, the amount of generated power that is generated in the wind power generation device, or the voltage at a designated location of said distribution line.

10. The power flow control system as set forth in claim 1, wherein:

each power source is a wind power generation device, and said measurement device measures, as said index value, the wind speed, the amount of generated power that is generated in the wind power generation device, or the voltage at a designated location of said distribution line.

11. The power flow control system as set forth in claim 1, wherein:

each power source is a wind power generation device, and said measurement device measures, as said index value, the wind speed, the amount of generated power that is generated in the wind power generation device, or the voltage at a designated location of said distribution line.

12. The power flow control system as set forth in claim 1, wherein:

said power-varying device is power storage device that charges and discharges electric power or a controllable load device that consumes electric power; and said calculation device regulates as said alteration amount: the amount of charging or discharging that is charged or discharged in said power storage device, or the amount of electric power that is consumed in said controllable load device.

13. The power flow control system as set forth in claim 1, wherein:

said power-varying device is power storage device that charges and discharges electric power or a controllable load device that consumes electric power; and said calculation device regulates as said alteration amount: the amount of charging or discharging that is charged or discharged in said power storage device, or the amount of electric power that is consumed in said controllable load device.

14. The power flow control system as set forth in claim 1, wherein:
   said power-varying device is power storage device that charges and discharges electric power or a controllable load device that consumes electric power; and
   said calculation device regulates as said alteration amount: the amount of charging or discharging that is charged or discharged in said power storage device, or the amount of electric power that is consumed in said controllable load device.

15. The power flow control system as set forth in claim 1, wherein:
   said power-varying device is power storage device that charges and discharges electric power or a controllable load device that consumes electric power; and
   said calculation device regulates as said alteration amount: the amount of charging or discharging that is charged or discharged in said power storage device, or the amount of electric power that is consumed in said controllable load device.

16. The power flow control system as set forth in claim 1, wherein:
   said power-varying device is power storage device that charges and discharges electric power or a controllable load device that consumes electric power; and
   said calculation device regulates as said alteration amount: the amount of charging or discharging that is charged or discharged in said power storage device, or the amount of electric power that is consumed in said controllable load device.

17. A power flow control method realized by a power flow control system that is provided with a power-varying device that changes the amount of distribution line power that is a value of the power flow that flows in a distribution line connected to a plurality of power sources that generate electric power, and to a higher-order system, said power flow control method comprising steps of:
   measuring an index value that relates to the total generated power amount that is the sum total of the amount of power that is generated in each power source;
   estimating said total generated power amount based on said index value;
   in accordance with this estimation result, regulating the amount of power that is altered in said distribution line by said power-varying device, using a conversion coefficient to estimate said total generated power amount from said index value;
   repeatedly measuring an amount of power flow fluctuation in a fixed time interval that is sent to or received from said higher-order system;
   judging whether a most recent amount of fluctuation, which is said amount of fluctuation that was measured at a present time, has decreased compared to said amount of fluctuation that was previously measured;
   judging whether, at the time of a previous alteration of said conversion coefficient, the conversion coefficient was altered such that the total generated power amount that is estimated by said calculation device would decrease;
   altering said conversion coefficient based on each judgment result, such that said total generated power amount will decrease when:
      said most recent amount of fluctuation has decreased, and moreover, when said control device has altered said conversion coefficient said total generated power amount will decrease at the time of said previous alteration, and
      said most recent amount of fluctuation has increased, and moreover, when said control device has altered said conversion coefficient said total generated power amount will increase at the time of said previous alteration; and
   altering said conversion coefficient based on each judgment result, such that said total generated power amount will increase when:
      said most recent amount of fluctuation has decreased, and moreover, when said control device has altered said conversion coefficient said total generated power amount will increase at the time of said previous alteration, and
      said most recent amount of fluctuation has increased, and moreover, when said control device has altered said conversion coefficient said total generated power amount will decrease at the time of said previous alteration.

18. A power flow control system comprising:
   a power-varying device that changes the distribution line power amount, which is a value of the power flow that flows in a distribution line that is connected to a plurality of power sources that generate electric power, and to a higher-order system;
   a measurement device that measures an index value that relates to the total generated power amount that is the sum total of the amount of generated power that is generated in each power source;
   a calculation device that estimates said total generated power amount based on said index value, and in accordance with the estimation result, regulates the amount of change of said distribution line power amount that is changed by said power-varying device, using a conversion coefficient to estimate said total generated power amount from said index value; and
   measures an amount of power flow fluctuation in a fixed time interval that is sent to or received from said higher-order system,
   alters said conversion coefficient such that said total generated power amount will decrease when:
      said most recent amount of fluctuation has decreased, and moreover, when said control device has altered said conversion coefficient said total generated power amount will decrease at the time of said previous alteration, and
      said most recent amount of fluctuation has increased, and moreover, when said control device has altered said conversion coefficient said total generated power amount will increase at the time of said previous alteration, and
   alters said conversion coefficient such that said total generated power amount will increase when:
      said most recent amount of fluctuation has decreased, and moreover, when said control device has altered said conversion coefficient said total generated power amount will increase at the time of said previous alteration, and
      said most recent amount of fluctuation has increased, and moreover, when said control device has altered said conversion coefficient said total generated power amount will decrease at the time of said previous alteration.

19. A power flow control method realized by a power flow control system that is provided with a power-varying device that changes the amount of distribution line power that is a value of the power flow that flows in a distribution line connected to a plurality of power sources that generate electric power, and to a higher-order system, said power flow control method comprising steps of:

measuring an index value that relates to the total generated power amount that is the sum total of the amount of power that is generated in each power source;

estimating said total generated power amount based on said index value;

in accordance with this estimation result, regulating the amount of power that is altered in said distribution line by said power-varying device, using a conversion coefficient to estimate said total generated power amount from said index value;

measuring an amount of power flow fluctuation in a fixed time interval that is sent to or received from said higher-order system;

altering said conversion coefficient, such that said total generated power amount will decrease when:

said most recent amount of fluctuation has decreased, and moreover, when said control device has altered said conversion coefficient said total generated power amount will decrease at the time of said previous alteration, and said most recent amount of fluctuation has increased, and moreover, when said control device has altered said conversion coefficient said total generated power amount will increase at the time of said previous alteration; and altering said conversion coefficient, such that said total generated power amount will increase when:

said most recent amount of fluctuation has decreased, and moreover, when said control device has altered said conversion coefficient said total generated power amount will increase at the time of said previous alteration, and said most recent amount of fluctuation has increased, and moreover, when said control device has altered said conversion coefficient said total generated power amount will decrease at the time of said previous alteration.

* * * * *